(12) United States Patent
Santoiemmo

(10) Patent No.: US 8,677,888 B2
(45) Date of Patent: Mar. 25, 2014

(54) SELECT SERVING AND FLAVORED SPARKLING BEVERAGE MAKER

(75) Inventor: Carl Santoiemmo, Willoughby Hills, OH (US)

(73) Assignee: Primo Products, LLC, Winston-Salem, NC (US)

( * ) Notice: Subject to any disclaimer, the term of this patent is extended or adjusted under 35 U.S.C. 154(b) by 489 days.

(21) Appl. No.: 12/573,507

(22) Filed: Oct. 5, 2009

(65) Prior Publication Data

US 2010/0251901 A1 Oct. 7, 2010

Related U.S. Application Data

(63) Continuation-in-part of application No. 12/594,678, filed as application No. PCT/US2008/062653 on May 5, 2008.

(60) Provisional application No. 60/927,329, filed on May 4, 2007.

(51) Int. Cl.
*A47J 31/00* (2006.01)

(52) U.S. Cl.
USPC ........ 99/323.2; 99/295; 426/477; 261/DIG. 7

(58) Field of Classification Search
USPC ...................... 99/323.2, 323.1, 295; 426/477; 261/DIG. 7
See application file for complete search history.

(56) References Cited

U.S. PATENT DOCUMENTS

| | | |
|---|---|---|
| 3,596,588 A | 8/1971 | Moss |
| 3,628,444 A * | 12/1971 | Mazza .............. 99/275 |
| 4,136,202 A | 1/1979 | Farve |
| 4,355,735 A | 10/1982 | Whorton, III et al. |
| 4,520,950 A | 6/1985 | Jeans |
| 4,793,513 A | 12/1988 | Verheijen |
| 4,815,366 A | 3/1989 | Hauslein |
| 4,836,414 A | 6/1989 | Credle, Jr. et al. |
| 4,919,041 A | 4/1990 | Miller |
| 4,944,217 A | 7/1990 | Watanabe |
| 4,960,261 A | 10/1990 | Scott et al. |
| 5,008,013 A | 4/1991 | Favre et al. |
| 5,063,836 A | 11/1991 | Patel |
| 5,071,594 A | 12/1991 | Borland et al. |
| 5,071,595 A | 12/1991 | Burrows |
| 5,111,740 A | 5/1992 | Klein |

(Continued)

FOREIGN PATENT DOCUMENTS

| | | |
|---|---|---|
| DE | 10 2007 014 386 A1 | 10/2008 |
| WO | WO 2005/060801 A1 | 7/2005 |

(Continued)

OTHER PUBLICATIONS

International Search Report and Written Opinion for International Application No. PCT/US2008/062653, mailed Aug. 14, 2008.

(Continued)

*Primary Examiner* — Reginald L Alexander
(74) *Attorney, Agent, or Firm* — Alston & Bird LLP

(57) ABSTRACT

The present invention relates generally to method and a device to make a single or a multiple repeated single servings of a select flavored, carbonated beverage. The instant abstract is neither intended to define the invention disclosed in this specification nor intended to limit the scope of the invention in any way.

20 Claims, 16 Drawing Sheets

(56) References Cited

U.S. PATENT DOCUMENTS

| | | | |
|---|---|---|---|
| 5,118,010 A | 6/1992 | Jeans | |
| 5,124,088 A | 6/1992 | Stumphauzer | |
| 5,188,019 A | 2/1993 | Vahabpour | |
| 5,195,422 A | 3/1993 | Newnan | |
| 5,260,081 A | 11/1993 | Stumphauzer et al. | |
| 5,285,718 A | 2/1994 | Webster et al. | |
| 5,295,611 A | 3/1994 | Simard | |
| 5,325,765 A | 7/1994 | Sylvan et al. | |
| 5,460,846 A | 10/1995 | Stumphauzer et al. | |
| 5,794,519 A | 8/1998 | Fischer | |
| 5,840,189 A | 11/1998 | Sylvan et al. | |
| 5,870,944 A | 2/1999 | Vander Zalm et al. | |
| 5,875,703 A | 3/1999 | Rolfes | |
| D408,679 S | 4/1999 | Potts et al. | |
| 5,901,635 A | 5/1999 | Lucas et al. | |
| 5,918,768 A | 7/1999 | Ford | |
| 5,975,365 A | 11/1999 | Hsieh | |
| 6,068,875 A | 5/2000 | Miller et al. | |
| 6,079,315 A | 6/2000 | Beaulieu et al. | |
| 6,082,247 A | 7/2000 | Beaulicu | |
| 6,142,063 A | 11/2000 | Beaulieu et al. | |
| 6,182,554 B1 | 2/2001 | Beaulieu et al. | |
| 6,305,267 B1 | 10/2001 | Rolfes | |
| D452,433 S | 12/2001 | Lazaris | |
| D452,434 S | 12/2001 | Sweeney | |
| 6,370,884 B1 | 4/2002 | Kelada | |
| D461,358 S | 8/2002 | Cahen | |
| 6,440,256 B1 | 8/2002 | Gordon et al. | |
| D462,865 S | 9/2002 | Honan et al. | |
| D474,110 S | 5/2003 | Sweeney | |
| D474,111 S | 5/2003 | Lazaris | |
| 6,589,577 B2 | 7/2003 | Lazaris et al. | |
| 6,606,938 B2 | 8/2003 | Taylor | |
| 6,607,762 B2 | 8/2003 | Lazaris et al. | |
| 6,645,537 B2 | 11/2003 | Sweeney et al. | |
| 6,655,260 B2 | 12/2003 | Lazaris et al. | |
| 6,658,989 B2 | 12/2003 | Sweeney et al. | |
| 6,666,130 B2 | 12/2003 | Taylor et al. | |
| 6,672,200 B2 | 1/2004 | Duffy et al. | |
| 6,698,332 B2 | 3/2004 | Kollep et al. | |
| 6,708,600 B2 | 3/2004 | Winkler et al. | |
| 6,712,342 B2 | 3/2004 | Bosko | |
| D489,215 S | 5/2004 | Honan et al. | |
| 6,742,772 B2 | 6/2004 | Kiefer | |
| 6,752,069 B1 | 6/2004 | Burke et al. | |
| D492,878 S | 7/2004 | Nakato et al. | |
| 6,820,535 B2 | 11/2004 | Fischer | |
| 6,843,164 B2 | 1/2005 | Drobeck | |
| 6,857,353 B2 | 2/2005 | Kollep et al. | |
| D502,362 S | 3/2005 | Lazaris et al. | |
| 6,941,856 B2 | 9/2005 | Font et al. | |
| 6,955,116 B2 | 10/2005 | Hale | |
| 6,974,052 B1 | 12/2005 | d'Hond et al. | |
| D513,572 S | 1/2006 | Schaffeld et al. | |
| 6,990,391 B1 | 1/2006 | Cunha et al. | |
| 7,017,735 B2 | 3/2006 | Carlson | |
| 7,021,197 B2 | 4/2006 | Chen et al. | |
| 7,126,479 B2 | 10/2006 | Claessens et al. | |
| 7,165,488 B2 | 1/2007 | Bragg et al. | |
| D544,299 S | 6/2007 | Schaffeld et al. | |
| D559,611 S | 1/2008 | Cheong | |
| 7,331,483 B2 | 2/2008 | Bhimani et al. | |
| 7,347,138 B2 | 3/2008 | Bragg et al. | |
| 7,360,418 B2 | 4/2008 | Pelovitz | |
| 7,377,162 B2 | 5/2008 | Lazaris | |
| D570,637 S | 6/2008 | Glucksman et al. | |
| 7,398,726 B2 | 7/2008 | Streeter et al. | |
| D582,714 S | 12/2008 | Hensel | |
| 7,472,643 B2 | 1/2009 | Mitchell et al. | |
| 7,513,192 B2 | 4/2009 | Sullivan et al. | |
| 7,523,695 B2 | 4/2009 | Streeter et al. | |
| 7,552,672 B2 | 6/2009 | Schmed | |
| D597,366 S | 8/2009 | Drake et al. | |
| D604,985 S | 12/2009 | Taylor et al. | |
| D607,258 S | 1/2010 | De Pra' | |
| D607,259 S | 1/2010 | De Pra' | |
| 7,640,845 B2 | 1/2010 | Woodnorth et al. | |
| 7,677,158 B2 * | 3/2010 | McDuffie et al. | 99/302 R |
| D622,999 S | 9/2010 | Murauyou et al. | |
| 7,798,054 B2 | 9/2010 | Evers et al. | |
| D626,368 S | 11/2010 | De Pra' | |
| D630,881 S | 1/2011 | Rezzonico | |
| D634,963 S | 3/2011 | Romandy | |
| 8,033,211 B2 * | 10/2011 | Halliday et al. | 99/295 |
| 2004/0112222 A1 | 6/2004 | Fischer | |
| 2004/0134357 A1 | 7/2004 | Cai | |
| 2004/0250686 A1 | 12/2004 | Hale | |
| 2005/0087255 A1 | 4/2005 | Humphrey et al. | |
| 2005/0154447 A1 | 7/2005 | Goshgarian | |
| 2005/0287251 A1 | 12/2005 | Lazaris et al. | |
| 2006/0016347 A1 * | 1/2006 | Girard et al. | 99/295 |
| 2006/0090653 A1 | 5/2006 | McDuffie et al. | |
| 2006/0112831 A1 | 6/2006 | Greenwald et al. | |
| 2006/0144244 A1 | 7/2006 | Girard et al. | |
| 2006/0174773 A1 | 8/2006 | Taylor | |
| 2006/0288776 A1 | 12/2006 | Pelovitz | |
| 2006/0288777 A1 | 12/2006 | Lazaris | |
| 2006/0292012 A1 | 12/2006 | Brudevold et al. | |
| 2007/0056994 A1 | 3/2007 | Woodnorth et al. | |
| 2007/0081367 A1 | 4/2007 | Hammond | |
| 2007/0131711 A1 | 6/2007 | Minard et al. | |
| 2007/0175334 A1 | 8/2007 | Halliday et al. | |
| 2007/0203587 A1 | 8/2007 | Erlandsson et al. | |
| 2007/0215239 A1 | 9/2007 | Dorney | |
| 2007/0221066 A1 | 9/2007 | Sullivan et al. | |
| 2008/0095904 A1 | 4/2008 | Sullivan et al. | |
| 2008/0115674 A1 | 5/2008 | Huang et al. | |
| 2008/0116262 A1 | 5/2008 | Majer | |
| 2008/0134902 A1 | 6/2008 | Zimmerman et al. | |
| 2008/0173705 A1 | 7/2008 | Girard et al. | |
| 2010/0024658 A1 | 2/2010 | Jacobs et al. | |
| 2010/0037779 A1 | 2/2010 | Pecci et al. | |
| 2010/0107887 A1 | 5/2010 | Bentley et al. | |
| 2010/0156614 A1 | 6/2010 | Adstedt et al. | |
| 2010/0251901 A1 | 10/2010 | Santoiemmo | |
| 2010/0303964 A1 | 12/2010 | Beaulieu et al. | |
| 2010/0326283 A1 * | 12/2010 | Evers et al. | 99/295 |

FOREIGN PATENT DOCUMENTS

| | | |
|---|---|---|
| WO | WO 2005/079361 A2 | 9/2005 |
| WO | PCT/US2005/004 | 6/2006 |
| WO | WO 2008/124851 A1 | 10/2008 |
| WO | WO 2010/064228 A1 | 6/2010 |

OTHER PUBLICATIONS

Keurig B140 & 200 Single-Cup Brewers; Green Mountain Coffee Roasters; p/n 67159; Jul. 2007; B140-200; 2 pages.

Office Action for U.S. Appl. No. 12/594,678 dated Oct. 19, 2011.

Notice of Allowance for design U.S. Appl. No. 29/369,100 dated Jun. 9, 2011.

Office Action for United Kingdom Application No. GB 1115093.5; dated Dec. 20, 2012.

Combined Search and Examination Report for Application No. GB 1115093.5 dated Dec. 23, 2011.

Office Action for German Application No. 10 2011 112 159.9 dated Jan. 17, 2013.

* cited by examiner

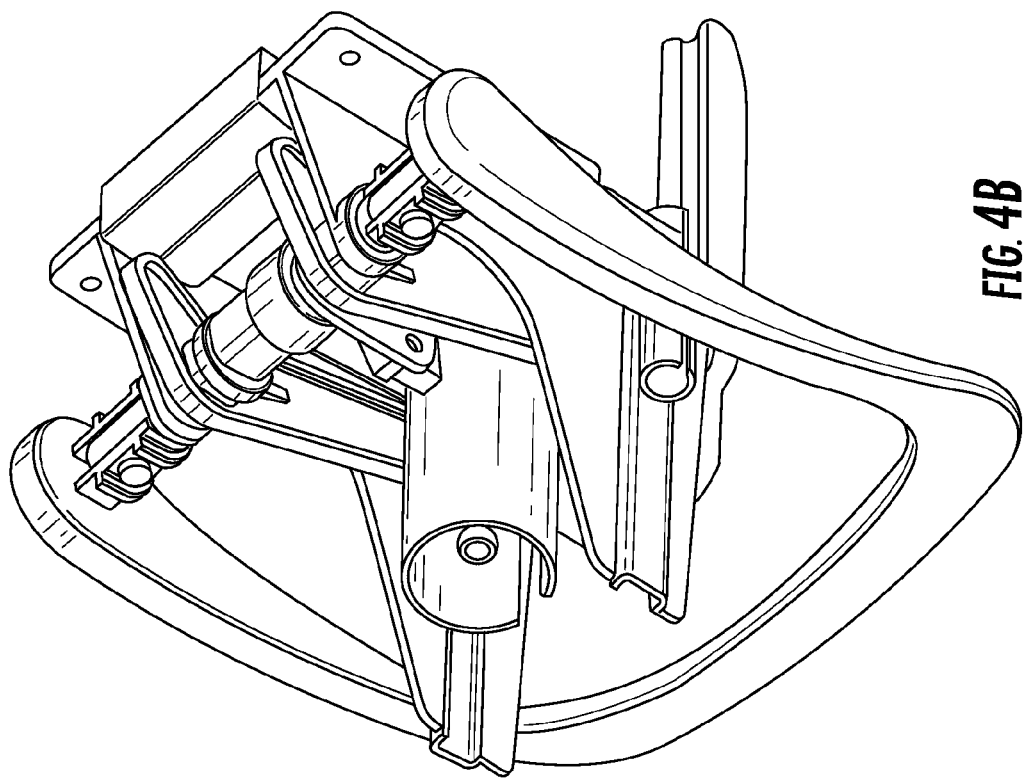
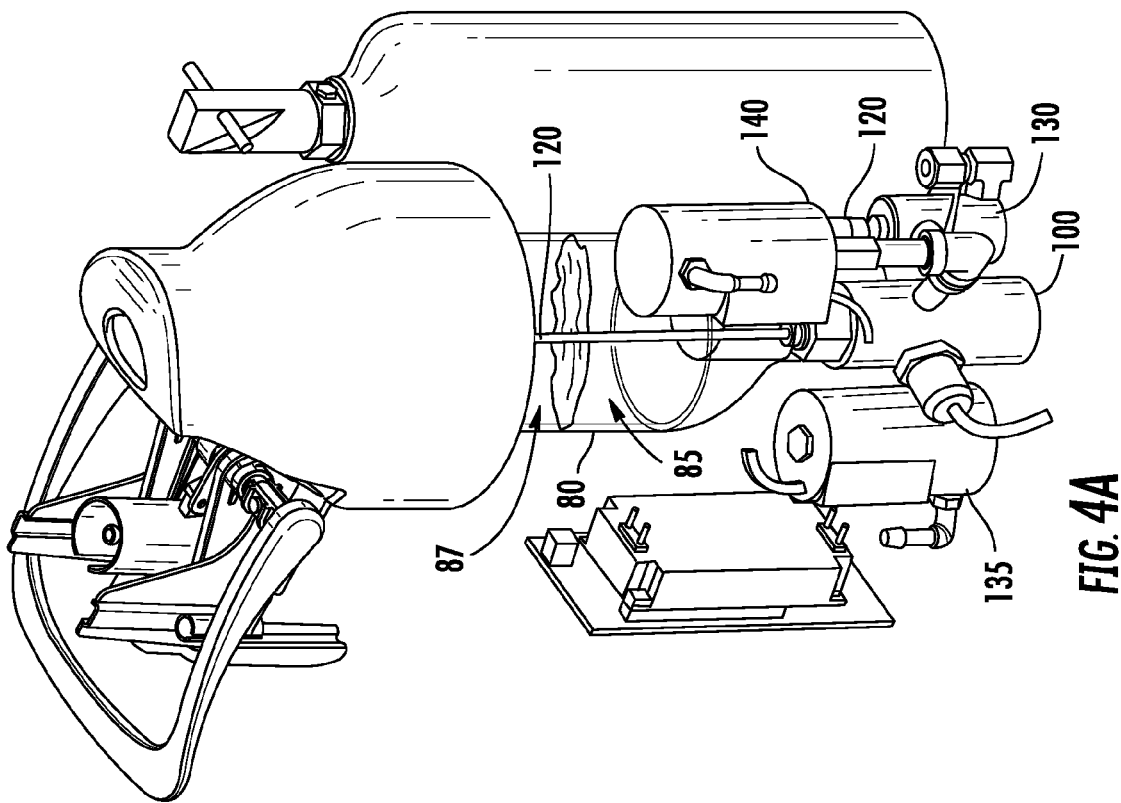
FIG. 4A
FIG. 4B

RP 226 - FITTING
RP 225 - JUNCTION BLOCK

SELECT SERVING AND FLAVORED SPARKLING BEVERAGE MAKER

RELATED APPLICATIONS

The present invention is a Continuation in Part of U.S. National Phase application Ser. No. 12/594,678 and claims the benefit of U.S. Provisional Patent No. 60/927,329 filed on May 4, 2007 and PCT/US08/62653 filed on May 5, 2008, both incorporated by reference herein as if rewritten in its entirety. In that the descriptions of specific embodiments in the '329 provisional application were presented for purposes of illustration and description under 35 U.S.C. 112, $1^{st}$ paragraph, and claims were not required, those claims previously provided were not intended to be exhaustive nor to limit the invention in any manner. Therefore, the scope of the present invention is in no way to be limited only by the claims previously provided as exemplary, nor by any possible, adverse inference under the rulings of *Warner-Jenkinson Company, v. Hilton Davis Chemical,* 520 US 17 (1997) or *Festo Corp. V. Shoketsu Kinzoku Kogyo Kabushiki Co.,* 535 U.S. 722 (2002), or other similar case law or subsequent precedent should not be made by changes from such claims subsequent to this Provisional patent application.

BACKGROUND OF THE INVENTION

1. Field of the Invention

The present invention relates generally to method and a device to make a single or a multiple serving of a select flavored, carbonated or noncarbonated beverage and, more particularly, to an apparatus and method for providing an individual serving 'bottling plant' for creating such beverages.

2. Description of the Related Art

The carbonated beverage industry has developed since the 1770s, when naturally carbonated mineral waters were emulated by impregnating distilled water with carbon dioxide. Such artificial mineral waters, usually called "soda water," began developing as a commercial industry as early as 1806 when soda waters were sold on a commercial scale using an apparatus that generated carbonated water from chalk by the use of sulfuric acid. The industry subsequently grew through the production of imitation mineral water in large amounts and the commercial fabrication of soda 'fountains' for point of purchase dispensing.

The drinking of either natural or artificial mineral water has always been considered a healthy practice. American pharmacists sold fortified mineral waters by adding herbs and chemicals to unflavored mineral water. Various herbs were used, including birch bark, dandelion, sarsaparilla, fruit extracts, and other substances, with flavorings also added to mask or improve the taste. Pharmacies with such soda fountains became a popular part of American culture.

Through this time most soft drinks were dispensed and consumed at a soda fountain, usually in a drugstore or ice cream parlor. In the early 20th century, sales of soda packaged in bottles increased exponentially, and in the second half of the 20th century, canned soft drinks became an important share of the market.

Currently, in the United States, soft drinks are sold mostly in various sized plastic bottles (2 Ls, 1.5 L, 1 L, 500 mL, 8, 12, 20 and 24 U.S. fluid ounce) and cans (12 U.S. fluid ounce cans, and short 8 U.S. fluid-ounce cans). Cans are packaged in a variety of quantities such as six packs, 12 packs and cases of 24, 36, and 360. Some Coca-Cola® products can currently be purchased in 8 and 12 U.S. fluid ounce glass bottles, and Jones Soda™ and Orange Crush™ are sold in 16 U.S. fluid ounce (1 U.S. pint) glass bottles.

With the advent of energy drinks sold in eight-ounce cans in the US, some soft drinks are now sold in similarly sized cans. It is also common for carbonated soft drinks to be served as fountain drinks in which carbonation is added to a concentrate immediately prior to serving.

In Europe soft drinks are typically sold in 2 L, 1.5 L, 1 L, 0.33 L plastic or 0.5 L glass bottles, or aluminum cans traditionally sized in 0.33 L, although 250 mL "slim" cans have become popular.

While in the current state of the art these soft drinks are distributed in these various plastic bottles or aluminum cans, these beverages are blended, carbonated, bottled, and packaged at a central 'bottling plant'. While this is partly due to logistic reasons, another reason for centralizing the production of carbonated and noncarbonated soft drinks is to control the quality, consistency, and repeatability of the resulting product. In a large centralized bottling plant, the manufacturer can control the water quality, syrup or flavor quality, proportions of the two, as well as temperature and pressure during the carbonation process. The last two are essential to controlling the amount of absorption of carbon dioxide ("$CO_2$") into the liquid.

Unlike the soda fountains of the early days of the industry, present attempts to allow for the creation of home sodas have been limited by the size and cost of the equipment needed to control the water, syrup, carbonation, temperature and pressure. Current attempts to create home soda dispensers utilize a large tank of $CO_2$ to carbonate a number of individual fountain beverages. The $CO_2$ is simultaneously added to both a branded soda-syrup and water dispensed from a spigot. Recipes for varied flavors are accomplished afterwards, wherein the bottled or the poured beverage is flavored by means of a sugared syrup.

Existing carbonating devices introduce $CO_2$ into a one liter or two liter bottle of water or juice by means of a single-use cartridge or a larger cylinder for multiple engagements of $CO_2$. A flavor can be added after the liquid is carbonated (known in the industry as post-mix). The contents are poured into a glass or drunk from the liter bottles.

Neither these efforts, nor a search of the prior art disclosed any patents that teach an in-situ counter top beverage maker for carbonated and uncarbonated beverages of the instant invention; however, the following references were considered related.

PCT/US2005/00457, filed in the name of Girard, discloses a liquid beverage dispenser that utilizes replaceable concentrate/extract cartridges. Such a device utilizes single use, replaceable cartridges of liquid concentrated coffee and dilutes the concentrate with hot water to create a single cup of hot beverage emulating a brewed coffee.

U.S. Pat. No. 5,918,768, filed in the name of Ford, discloses a beverage mixing and dispensing apparatus that utilizes powdered beverage substances (such as coffee or hot chocolate) to which it adds hot water and steam to create hot brewed coffee, cappuccino, or hot chocolate.

Of considerable relevance is U.S. Patent Publication No. US2006/0112831, filed in the name of Greenwald et al. While the Greenwald et al. references discloses the capability of dispensing a cold beverage, a feature incorporated into the present invention in combination, the Greenwald et al. reference, in utilizing a cold loop heat exchanger (requiring about 5 gallons of coolant) as well as other elements limit the utility of such a device as impractical for home use (such as placement on a user's kitchen counter, among other limitations).

In addition, the current consumer demands a healthy alternative to existing sugary soft drinks. There is a willingness to pay for the convenience of having a beverage that's healthy, portion controlled (single-serving glass), avoids unnecessary waste, is continually fresh. Additionally, there is a need for such beverages to be always cooled, and made to one's specific taste by regulating and controlling the beverage temperature, carbonation level, type of beverage, and specific flavor and amount of flavor. These consumer demands are seen in parallel to the coffee consumer. They have demanded, and now have, coffee makers that make a single-serving cup, always fresh and have the ability to customize the individual's taste by controlling the strength of the flavor and type of flavor and type of beverage, e.g.: regular coffee, cappuccino, lattes, etc.

Consequently, a need is seen for an on-demand, in situ single dose soft drink machine capable of creating a sparkling or nonsparkling flavored waters, juices or sodas.

SUMMARY OF THE INVENTION

The present invention teaches a single serving beverage maker that provides a means to select a flavor, to select an amount of flavor, to control a carbonation level, to control the chilled temperature and to select the type of beverage, e.g., a sparkling water, a sparkling soda or a sparkling juice.

The present invention provides a means for a person to repeatedly and to consecutively make one of a number of different single-serving beverages at home.

It is an object of the present invention to provide a means to make a single serving of a beverage in the home and on demand.

It is an object of the present invention to be able to create beverages including flavored waters with vitamins/minerals, sport drinks, energy drinks, herbal teas or other carbonated or non-carbonated cold beverages in a manner that is individually customized.

It is an object of the present invention to provide a means to control the proportion of concentrate to diluent, total volume, temperature, pressure and the amounts of carbonation added to sparkled beverages.

It is an object of the present invention to comprise a means to regulate and to control the beverage temperature.

It is an object of the present invention to comprise a means to regulate and to control the pressure at which the beverage is cooled and/or carbonated.

It is an object of the present invention to provide a means to regulate the level of carbonation.

It is a further object of the present invention to provide a means to regulate and the select the flavor of the sparkling beverage at the time the beverage is dispensed.

It is an advantage of the foregoing means to provide an immediate and a continued freshness to the beverage.

It is a final object of the present invention to provide all of the benefits the foregoing objects entail.

BRIEF DESCRIPTION OF THE DRAWINGS

The advantages and the features of the present invention will become better understood with reference to the following and the more detailed description and the claims taken in conjunction with the accompanying drawings, in which like elements are identified with like symbols, and in which:

FIG. 4 is a partial perspective view thereof shown having the outer housing 12 removed;

DESCRIPTION OF THE PREFERRED EMBODIMENTS

Figure 1:
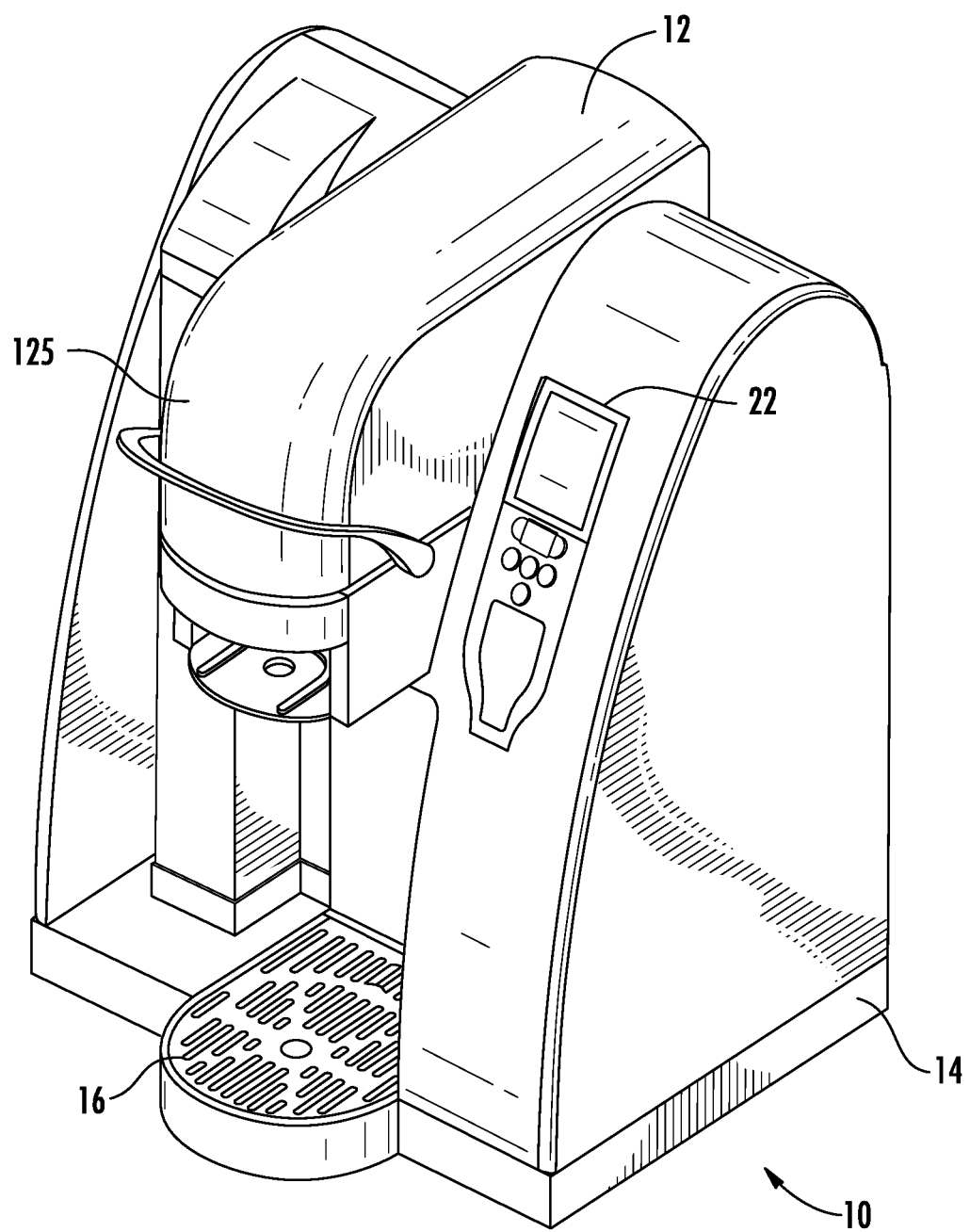
FIG. 1 is a front perspective view of an in-situ countertop beverage maker for carbonated and uncarbonated beverages according to the preferred embodiment of the present invention.

The best mode for carrying out the invention is presented in terms of its preferred embodiment, herein depicted within the Figures. As described below, a preferred embodiment, as anticipated at the time of filing, is identified and described as exemplary of the teachings of the present invention. However, the disclosure is not intended to be narrowly construed by this exemplary embodiment, as one skilled in the art would know that the operational and functional equivalent of many of the components, systems, steps and processes taught herein could be modified or replaced by equivalent components, systems, steps and processes and still remain within the spirit and teachings of the present invention.

1. Detailed Description of the Figures

Referring now to FIG. 1-4, a preferred embodiment of an in-situ counter top beverage maker for carbonated and uncarbonated beverages based select serving, flavored and/or carbonation, hereinafter referred to generally as a beverage maker 10, is shown. An outer housing 12 covers and contains the modular internal systems while providing an aesthetically pleasing industrial design. While many of the teachings and improvements of the present invention can be achieved without limitation to size or form factor, one additional key improvement taught by the present disclosure is to be able to provide a beverage maker 10 that can fit conveniently onto a standard kitchen counter top. As such, it is anticipated that the outer housing 12 would be capable of having an overall height of less than 15.5 inches, with a preferred outer dimension being within an overall cube of 15.5 inches high by 14 inches wide by 12.75 inches deep.

As shown best in conjunction with FIG. 1, the housing 12 is affixed to a base 14, and provided with additional structural integrity and which further functions as an attachment member for connection of the various system components as will be described in greater detail below. A base splash plate 16 or overflow tray is further supported by the base 14 and is of a size, shape and location as to provide for collection of spilled or otherwise mis-dispensed fluids. According to the preferred embodiment presented herein, the overflow tray is adapted to collect up to 16 fluid ounces of liquid in that the present design has been selected for dispensing of either eight or sixteen ounce beverages, as will be described in greater detail below. Fluid is introduced to a pitcher assembly 18. The pitcher assembly 18 is best shown in conjunction with FIG. 6a through FIG. 9b, the pitcher assembly 18 comprise a pitcher body 60 having a fluid reservoir 64 contained by a removable pitcher lid 62. It is anticipated that the pitcher assembly 18 will be removable from the machine housing 12 such as to allow the assembly 18 to function as a beverage pitch capable of being placed in a refrigerator (not shown) such as to chill any fluid contents. The pitcher assembly 18 allows for the pressure feed of introduced water to a pump valve as described in greater detail below. While the selection of any particular volume of water reservoir 60 would be a design choice to accommodate an individual performance requirement, shown in the present invention is a 64 fluid ounce water reservoir 60 formed as a blow molded volume. It is anticipated that a person having ordinary skill in the relevant art, in light of the teachings and goals of the present invention, would envision as an alternate design choice to incorporate a rigidly attached (i.e. non-removable) fluid reservoir mounted within or on the housing 12 and having access through a fluid fill door. It is anticipated that such a functionally equivalent design alternative would require a means of chilling the contents of such a reservoir, a means for insulating such a reservoir, or both.

The housing 12 further supports a control area 22 forming an operational interface or user control interface, as described in greater detail below. A filling area, generally shown as 24 includes a piercing mechanism 26 (as described in greater detail below) which allows for mixing of chilled carbonated or noncarbonated water with a single portion flavor concentrate container above the base splash plate 16.

Figure 2:
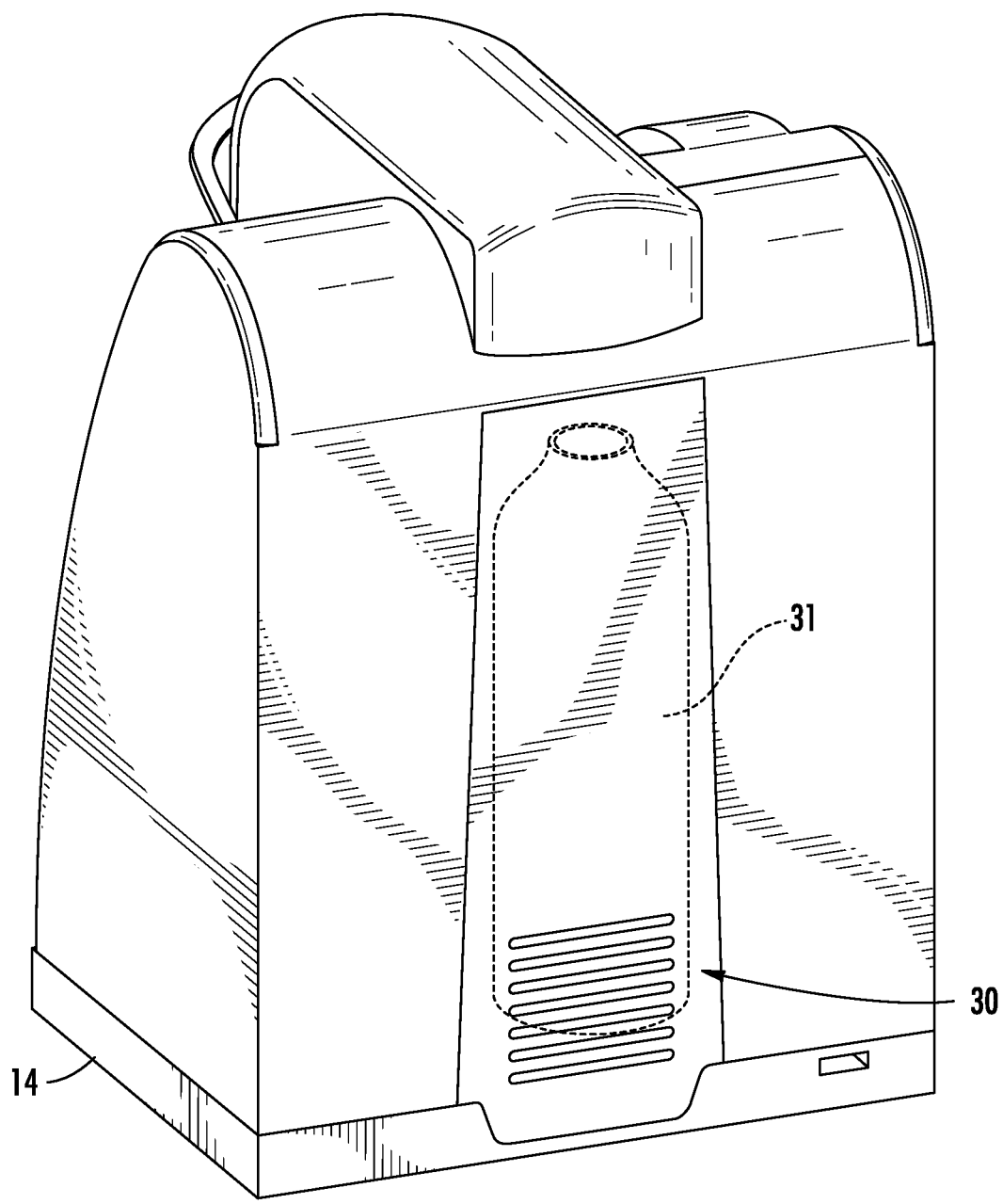
FIG. 2 is a rear perspective view thereof.
Figure 3:
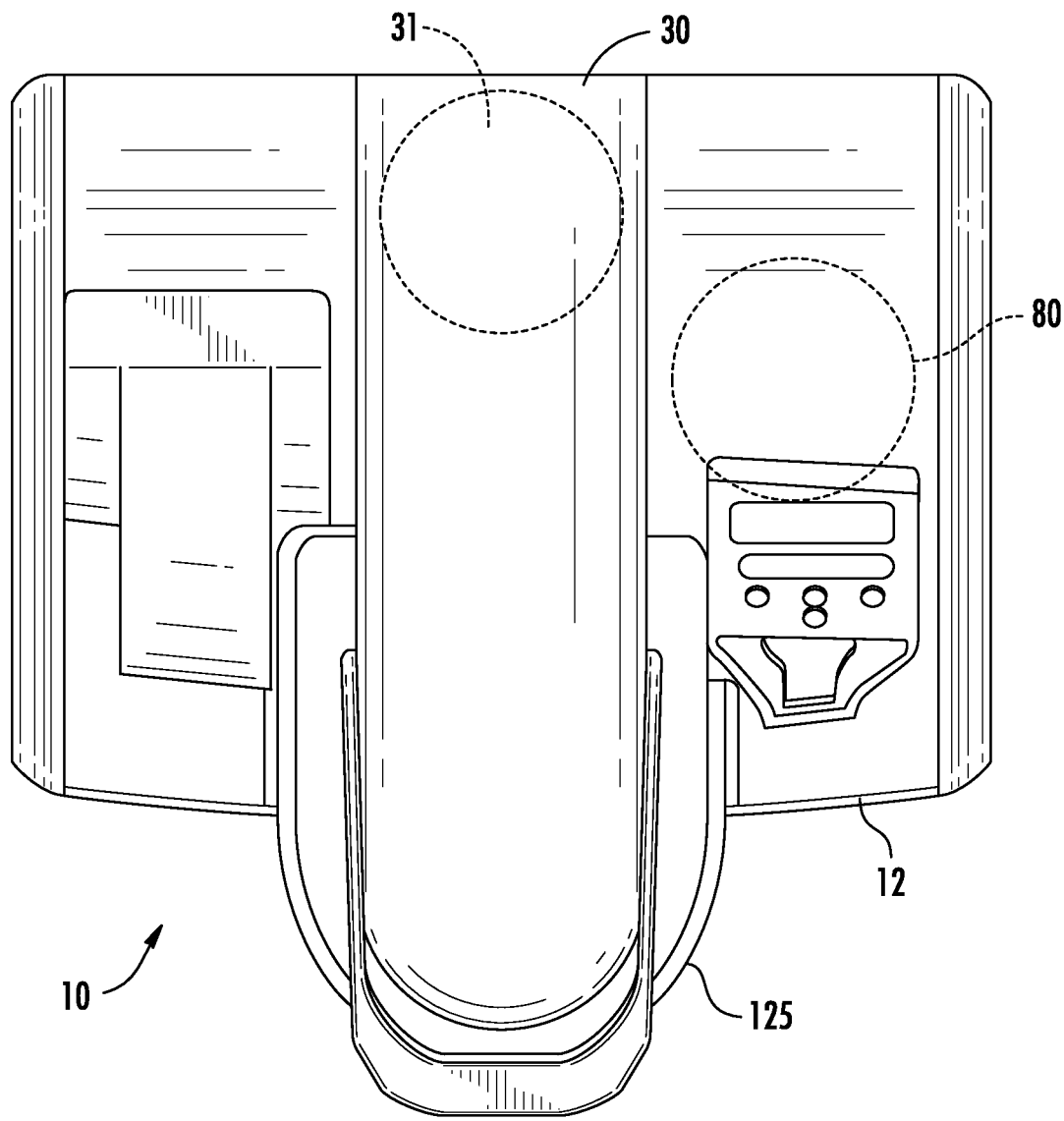
FIG. 3 is a top plan view thereof.

Referring in conjunction with FIG. 2, the rear of the housing 12 forms an access area 30 for providing access to or egress of a replaceable $CO_2$ canister 31 which provides the necessary $CO_2$ for carbonation of carbonated beverages.

In order to provide consistent, available, and economical source of $CO_2$, it is anticipated that the beverage machine 10 of the present invention would take advantages of an existing source of such compressed carbonating gas such as a paintball canister. Paintball is a game in which players eliminate opponents by hitting them with pellets containing paint (referred to as a "paintball") usually shot from a carbon dioxide or compressed-gas (HPA or $N_2$) powered paintball gun (or marker). Paintball currently draws a wide array of people, and the Sporting Goods Manufacturers Association estimates that over 5.4 million people played the game in the United States in 2007, with over 1.5 million playing at least 15 times that year. The most common gas propellant is CO, and typically comes in the three sizes of 9 oz, 12 oz and the 20 oz. The bigger 20 oz tanks can fire 500 to 1500 shots depending on the efficiency of the marker.

One such 20 oz cylinder 31 is supplied by Catalina Cylinders of Hampton, Va. It has been found that a Catalina Cylinders 20 ounce cylinder, such as is provided under part no. 9055, can provide a sufficient source of carbonation and motive force for use with the present design. Such a selection has a service pressure of 1800 psi, and is anticipated as being capable of producing approximately 300 individual services of carbonated beverage before needed to be exchanged or refilled.

Referring now especially to FIGS. 1-2, and in conjunction with FIG. 4 the inner componentry of the beverage machine 10 are shown in greater detail for increased clarity in understanding its operation. Given that the temperature of the working fluid is a critical limiting condition for the absorption of $CO_2$ such as to create a carbonation 'fizz' of a desired saturation, it has been found that a refrigerated water be used within the water reservoir 60. It is anticipated that in an alternate embodiment a secondary cooling means can be located at the water reservoir 60 to provide additional cooling to the reservoir contents. In addition, it is further anticipated that to allow for increased performance and decreased cycle time in the absence of an available source of refrigerated water, an additional primary cooling means would additionally be incorporated for cooling the carbonation chamber, or other components in contact with the beverage fluid prior to or while it is being carbonated. The primary or secondary cooling means are anticipated as comprising a generally conventional refrigeration compressor, or a thermoelectric cooler or solid state heat pump that operates on the Peltier effect and having an internal heat sink in thermal communication with the cold side of the thermoelectric cooler to provide increased heat transfer surface area to the liquid volume on the inside of the reservoir.

Figure 11B:
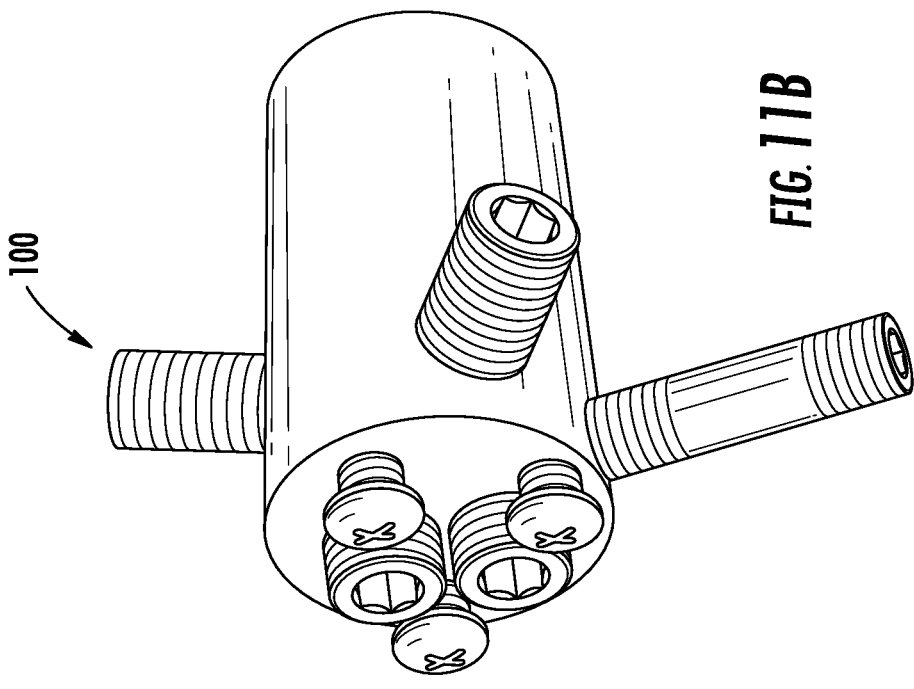
FIG. 11a and FIG. 11b are perspective views of a junction block 100 for use with the preferred embodiment of the present invention.
Figure 11A:
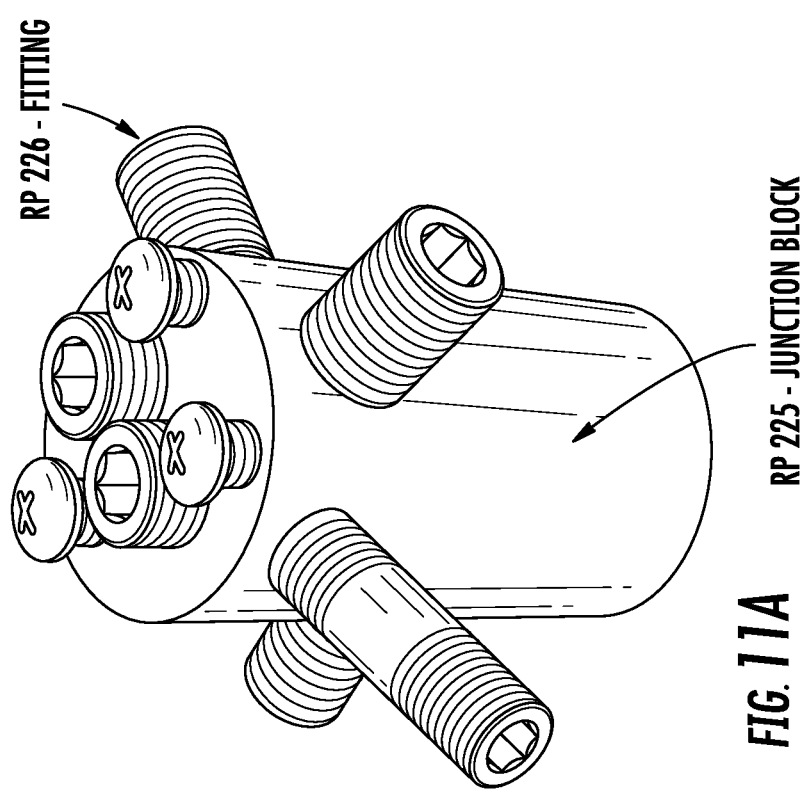

The contents of the reservoir 60 are in fluid communication with a junction block 100. The junction block 100 is shown in greater detail in conjunction with FIG. 11a and FIG. 11b. The junction block 100 functions as a manifold for distribution of $CO_2$, chilled water, and carbonated water throughout the system. The carbonation chamber 80 is connected to the junction block 100 and in fluid communication with the various access ports as described herein.

A drain valve 120 provides egress discharge of the contents of the carbonation chamber 80 and is in fluid communication with the flavor dispensing and mixing assembly 125. A $CO_2$ valve 130 is in fluid communication between the cylinder 31 and the junction block 100, and controls the flow of pressurized $CO_2$ to the carbonation chamber 80. A vent valve 135 is also in fluid communication with the cylinder 31, and opens to vent for filling of the carbonation chamber 80 to allow easier filling of the chamber with fluid prior to carbonation. Further, a pump valve 140 control flow from the transfer pump 70 from the lower part of the reservoir to the suction input, and transfers a drink volume of water from the reservoir 60 to the carbonation chamber 80.

Figure 12:
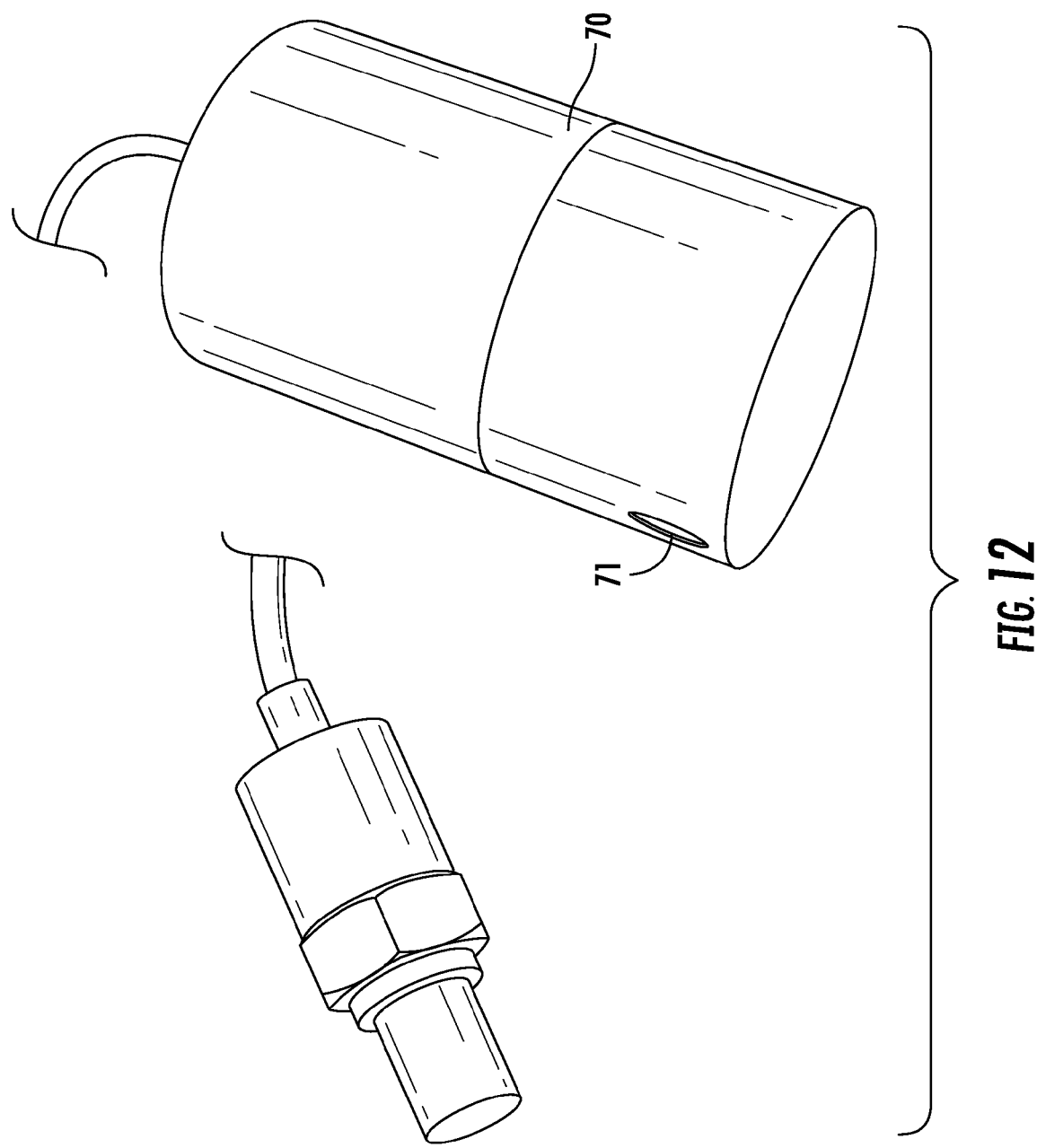
FIG. 12 is a perspective view of a pump 70 for use with the preferred embodiment of the present invention.
Figure 13B:
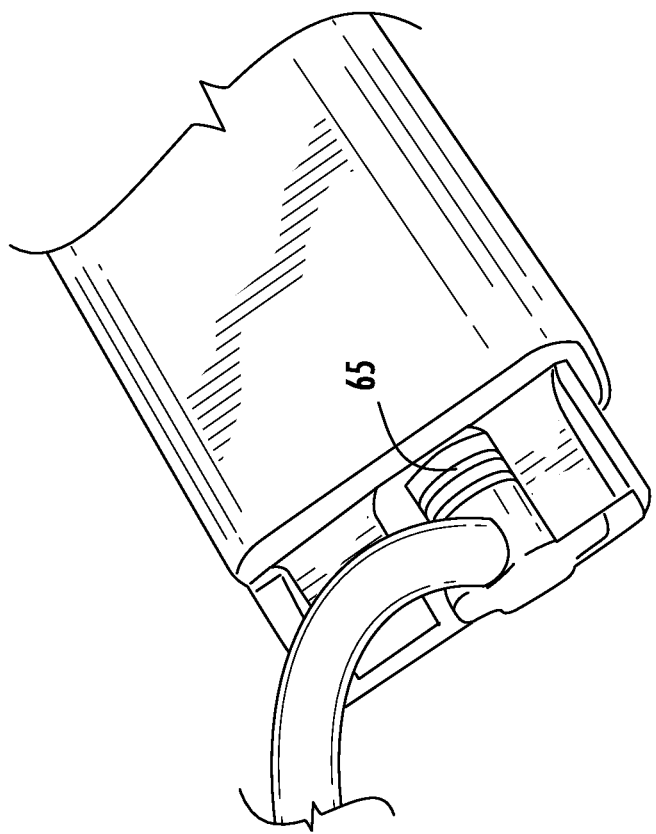
FIG. 13b is a detail view showing the pump inlet line 150 in communication with the discharge orifice 65 formed by the reservoir 60 for use with the preferred embodiment of the present invention.
Figure 13A:
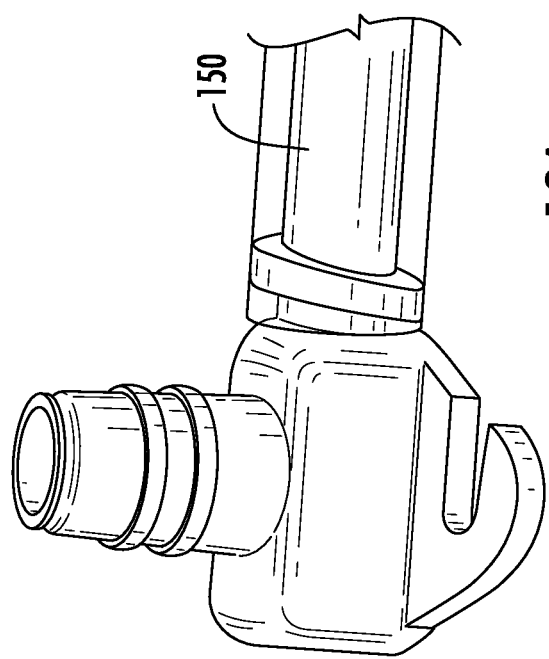
FIG. 13a is a detail view of a pump inlet line 150.
Figure 14B:
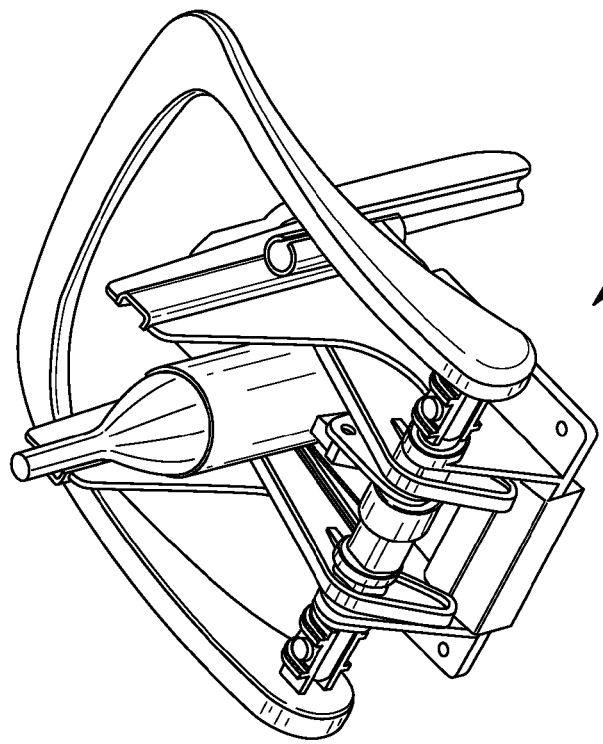
FIG. 14a through FIG. 14c are perspective views of exploded details of a flavor dispensing and mixture mechanism 125 for use with the preferred embodiment of the present invention.
Figure 14A:
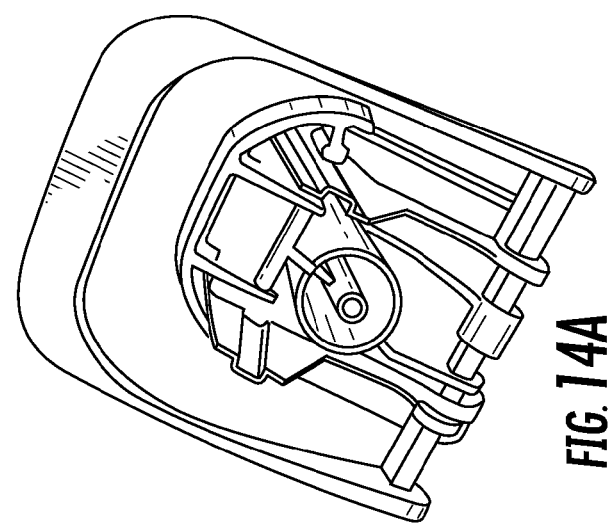
Figure 14C:
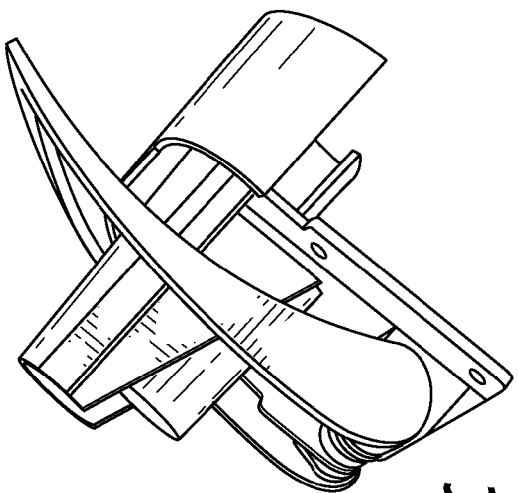

In conjunction with FIG. 12, the pump 70 is shown in greater detail. The pump inlet 71 is in fluid communication with a pump inlet line 150, as shown in conjunction with FIG. 13a and FIG. 13b. The pump inlet line 150 in is fluid communication with a discharge orifice 65 formed in the bottom of the pitcher body 60 (best shown in FIG. 8 and FIG. 13b).

Figure 15:
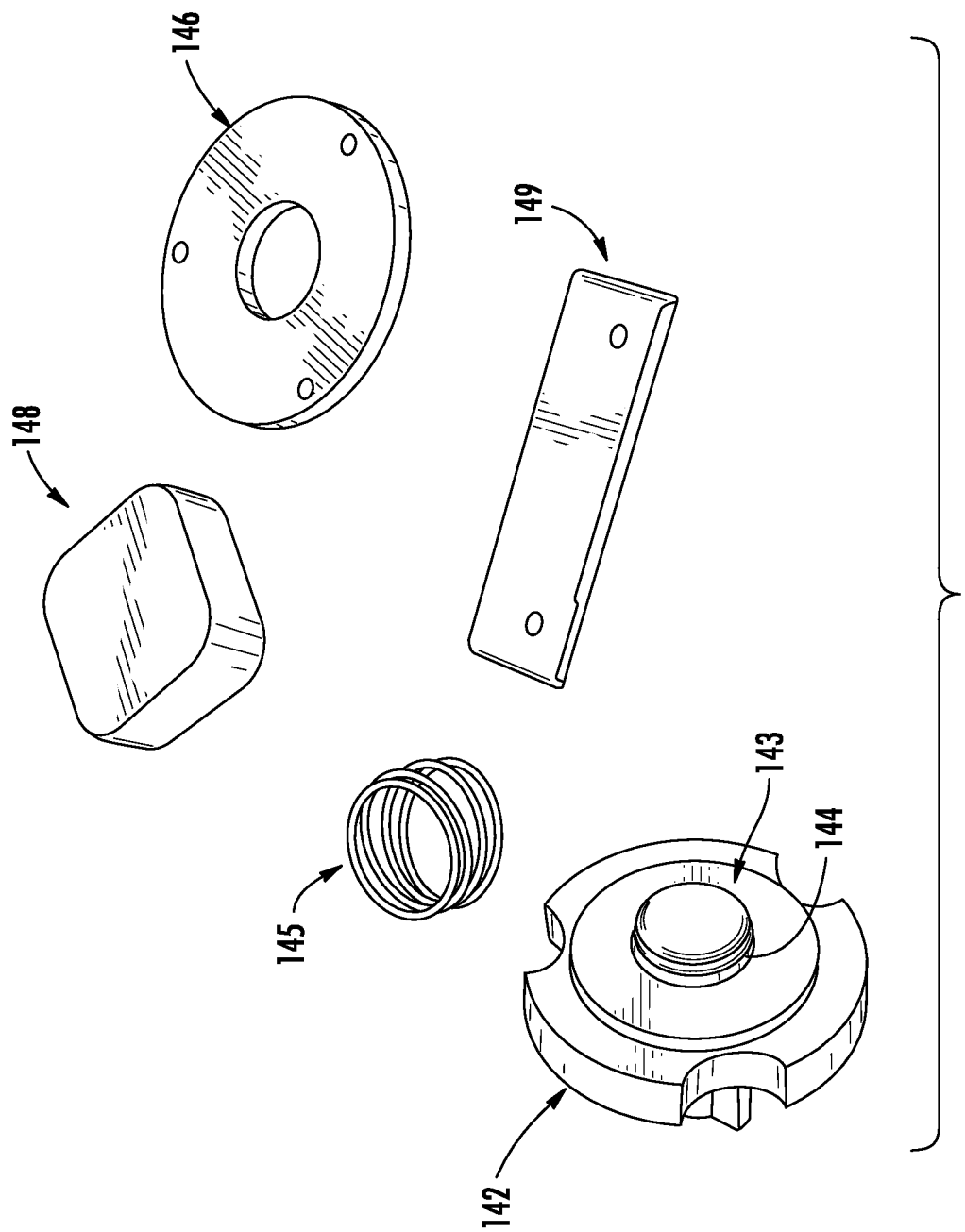
FIG. 15 is a an exploded view of the liquid level control mechanism for use with the preferred embodiment of the present invention.

Referring now to FIG. 15, an exploded view of the liquid level control mechanism 140 is shown for use in controlling the discharge of refrigerated liquid from the reservoir 64 to the pump inlet line 150. A valve body 142, having a sealing lower surface (as shown by washer 143 and O-ring 144) seats over the orifice 65 and is spring urged in a closed condition via a pitcher valve spring 145 held in position by a pitcher valve retainer 146. Additionally, a magnetic float switch forming a magnetic float housing 148 and a magnet retainer 149 provide a level sending input to indicate a low level condition to prevent operation of the pump and alarming to the user.

It is anticipated that the carbonation chamber 80 shown in its preferred embodiment would comprise a 16 oz. canister of similar design and specification as that provided for the 20 oz cylinder 31 used for storing carbon dioxide. Due to the need to retain pressurized fluid in a safe manner, it is anticipated that the carbonation chamber 80 is formed of similar material and style as the cylinder 31, but selected in a smaller size. As such, the carbonation chamber 80 as shown is also supplied by Catalina Cylinders of Hampton, Va. It has been found that a Catalina Cylinders 16 ounce cylinder can provide a sufficient volume to receive carbonation from a source having a service pressure of 1800 psi.

One particular feature and improvement of the present teachings include the function of the carbonation chamber 80 as a 'dose carbonator'. For purposes of the present invention a 'dose carbonator' refers to a controlled volume in which temperature, pressure, water volume, and, ultimately, $CO_2$ absorption can be performed and controlled. As such, the internal volume 85 is designed to hold liquid volume, plus an additional headspace 87. It is anticipated that the volume 85 less the volume of the headspace 87 is equal to 7 fluid ounces for dispensing of 8 ounce beverages, and 14 fluid ounces for dispensing 16 ounce beverages. In this manner, a flavorings, essences and syrups are blended in a fixed proportion of 1 ounce flavoring to 7 ounces of chilled (or carbonated) water or 2 ounces flavoring to 14 ounces of chilled (or carbonated) water.

It is anticipated that the temperature of the internal fluid contents of the carbonation chamber 80 can be obtained to or maintained at 37° F. with the introduction of chilled water at or below this temperature; it is further anticipated that the pressure of the internal volume 85 can be maintained at 150 psi. This provides an optimum condition for absorption of $CO_2$ into the water.

In order to obtain a pressure of 150 psi, the cylinder 31 of $CO_2$ is in fluid communication with the internal volume 85 through the $CO_2$ inlet of the junction block 100. A pressure transducer 110 controls the introduction of the 1800 psi working pressure of CO, from the cylinder 31 to the $CO_2$ inlet.

In order to optimize the absorption of the fixed dose of carbonated water, it is anticipated that the head space 87 should be vented of any residual air and filled with $CO_2$. This can be done by driving $CO_2$ through a discharge straw 120 and out through the vent valve 135. It is further anticipated that a pulsed introduction of $CO_2$ into the $CO_2$ inlet would allow for improved incremental carbonation of the water until an optimum pressure of 150 psi is obtained within the volume 85 and maintained by the vent valve 135.

After cooling, pressurizing and carbonating the working volume of water, the volume 85 is transferred to the filling area 24 for mixing of carbonated or non-carbonated water to provide beverage mixing water for the creation of carbonated and non-carbonated, chilled flavored beverages. It is anticipated that this volume 85 will be emptied by the urging force of the residual pressure within the head space 87, thereby allowing dispensing without the need of an additional pump. In the instance where a noncarbonated beverage is being blended, the second high pressure valve 102 can communicate an urging volume of pressurized gas instead.

As shown in FIG. 1 and FIG. 14a through FIG. 14c and FIG. 16, the use of individually packed, single use disposable flavor cups 200 are anticipated which include a mixing area 200a of a volume greater than the volume that will be filled with the flavors of choice to make sparkling flavored water and a syrup to make vitamin fortified and mineral added, low sugar soda pop. By way of example, in the preferred embodiment a flavor cup 200 would be available in two embodiments, one having a capacity of slightly more than 1 oz., but will be filled with 1 oz. syrup flavor concentrate and the second one having a capacity of slightly more than 2 oz., but will be filled with 2 oz. syrup flavor concentrate. A custom vacuum formed design incorporates a indexing ridge 201, and a sealed foil cover 203 covers and seals the flavor cup 200. When placed in the mixing chamber 125, the foil 203 is pierced on the top and, in doing so, will allow the cup to move downward and be pierced a second time from the bottom. An upper peripheral flange 205 therein support the cup. When the piercing needle approaches from the top of the cup, it will be engaged and sealed about its perimeter by the foil and around the piercing cite. The flavor cup 200 thereafter functions as a mixing chamber for carbonated or noncarbonated chilled water and flavor syrup.

2. Operation of the Preferred Embodiment

Figure 5:
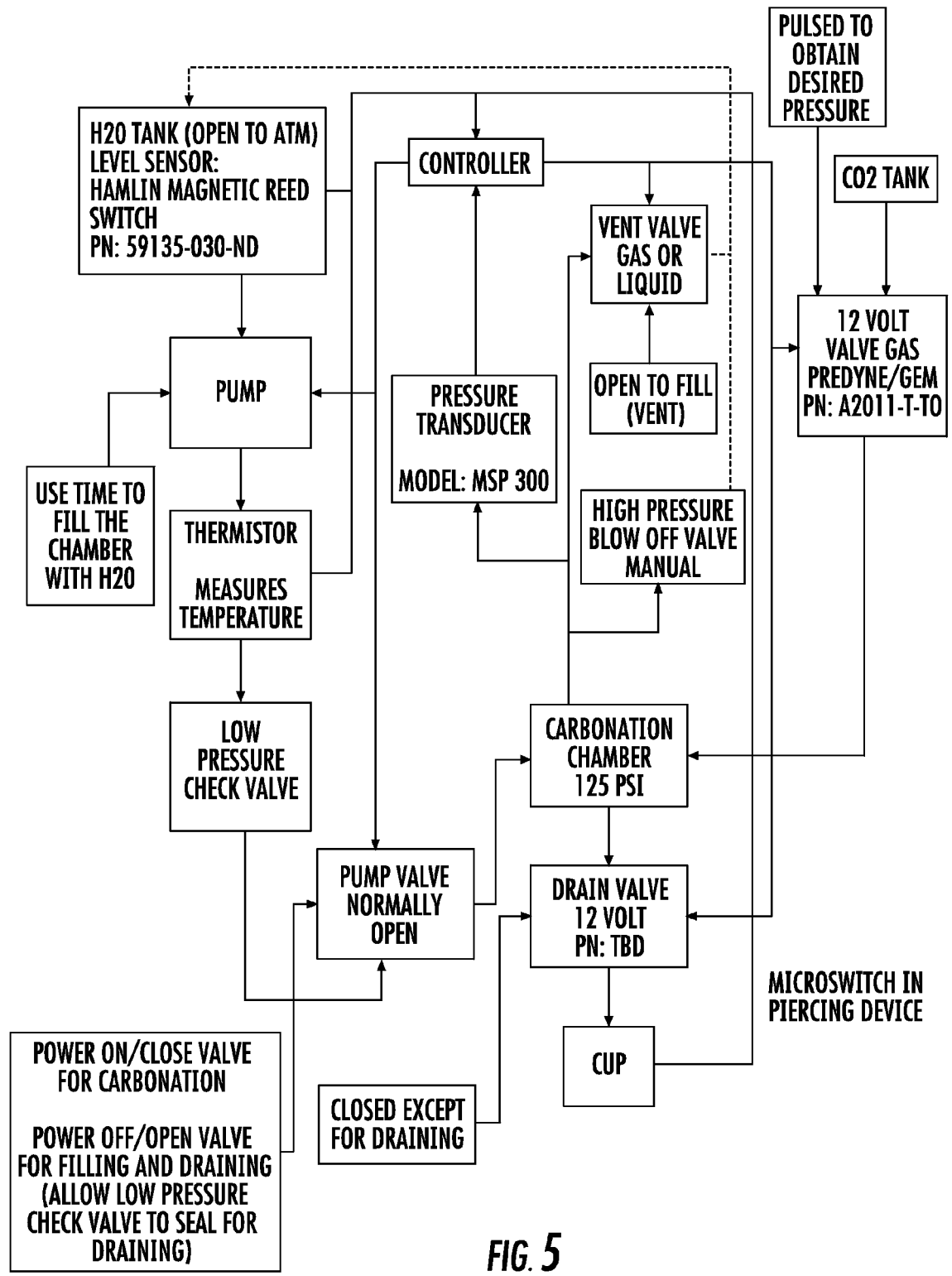
FIG. 5 is an operational flow chart of an in-situ countertop beverage maker for carbonated and uncarbonated beverages according to the preferred embodiment of the present invention.
Figure 6A:
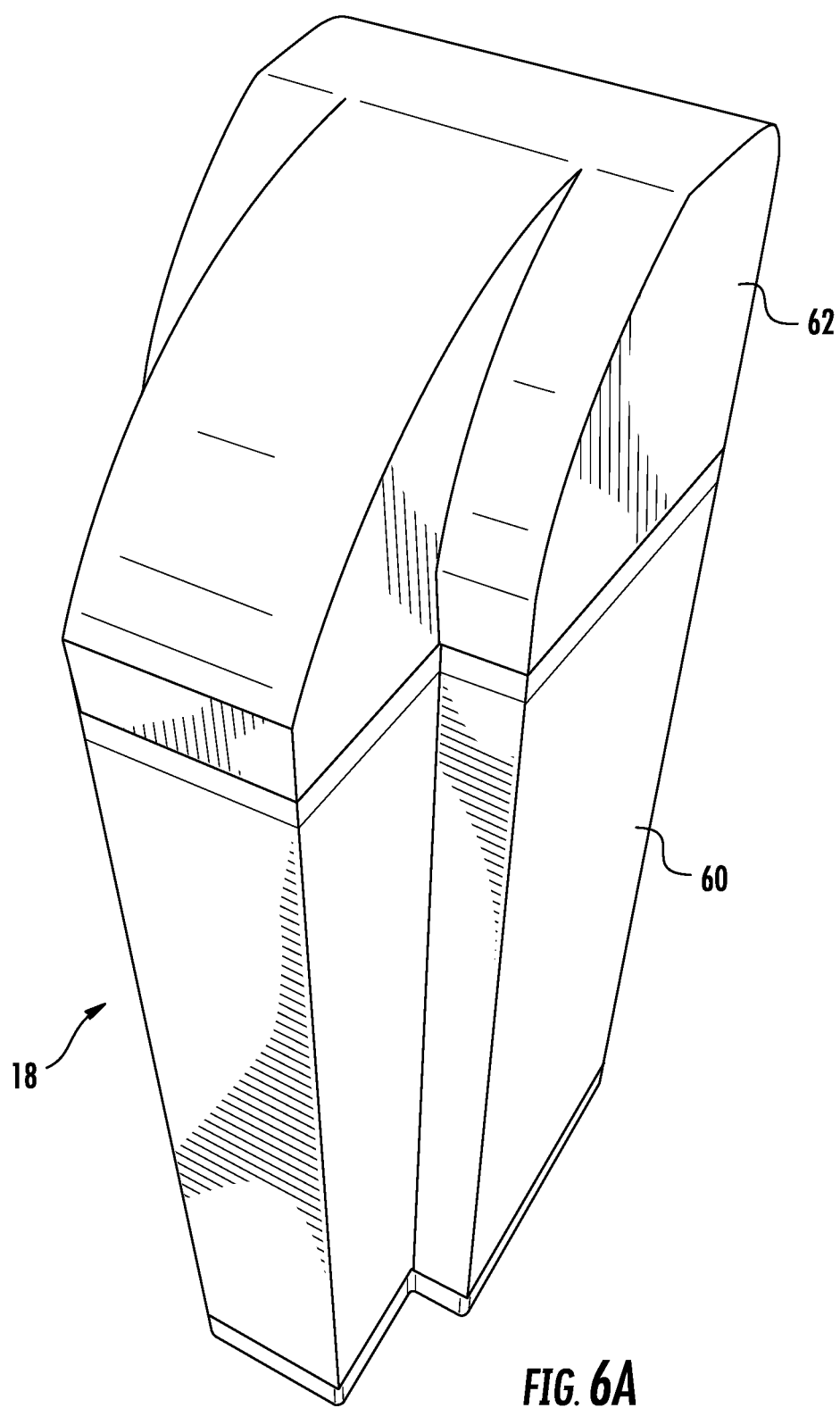
FIG. 6a is a front right perspective view of a pitcher assembly 18 for use with the preferred embodiment of the present invention.
Figure 6B:
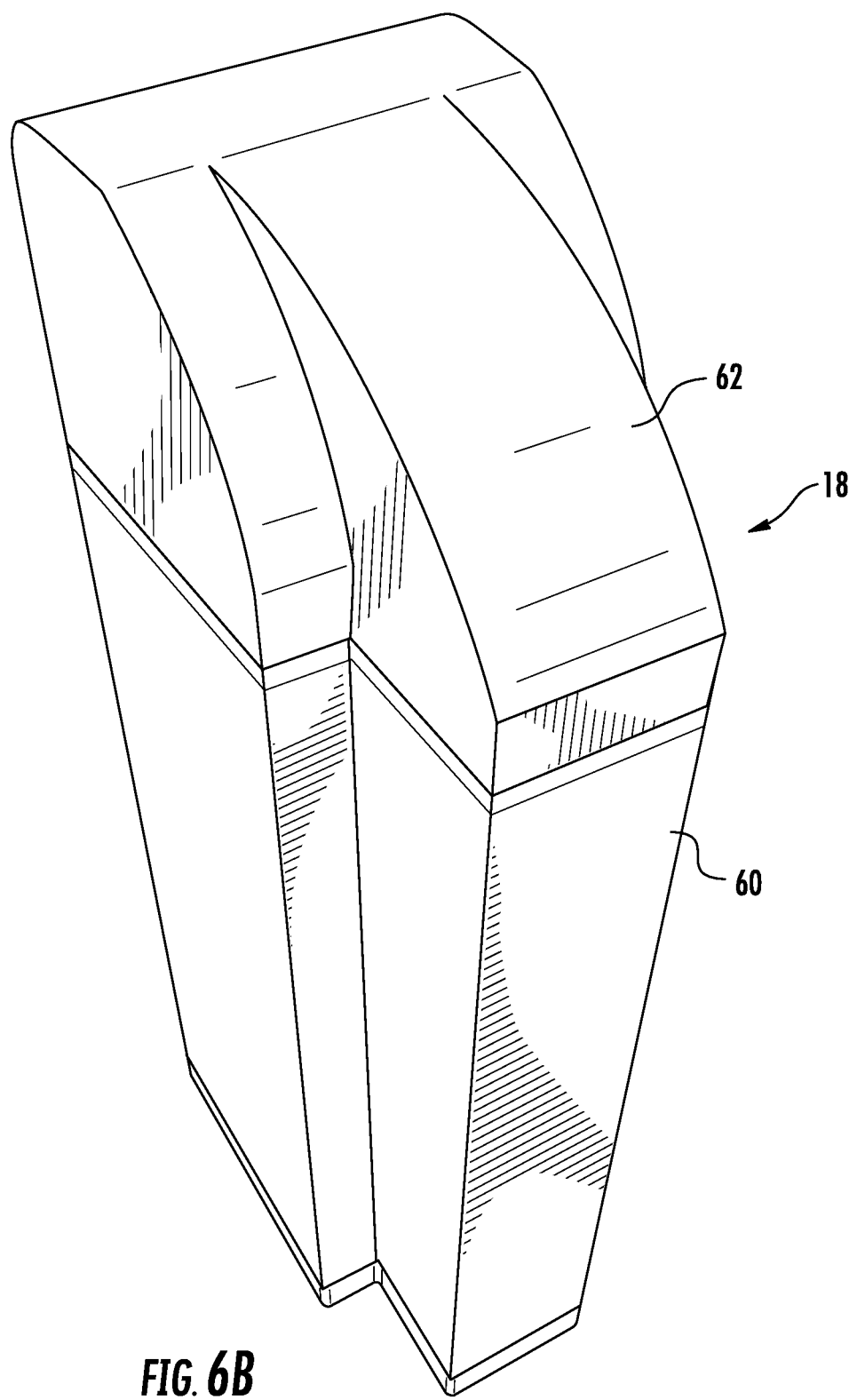
FIG. 6b is a front left perspective view of a pitcher assembly 18 for use with the preferred embodiment of the present invention.
Figure 7:
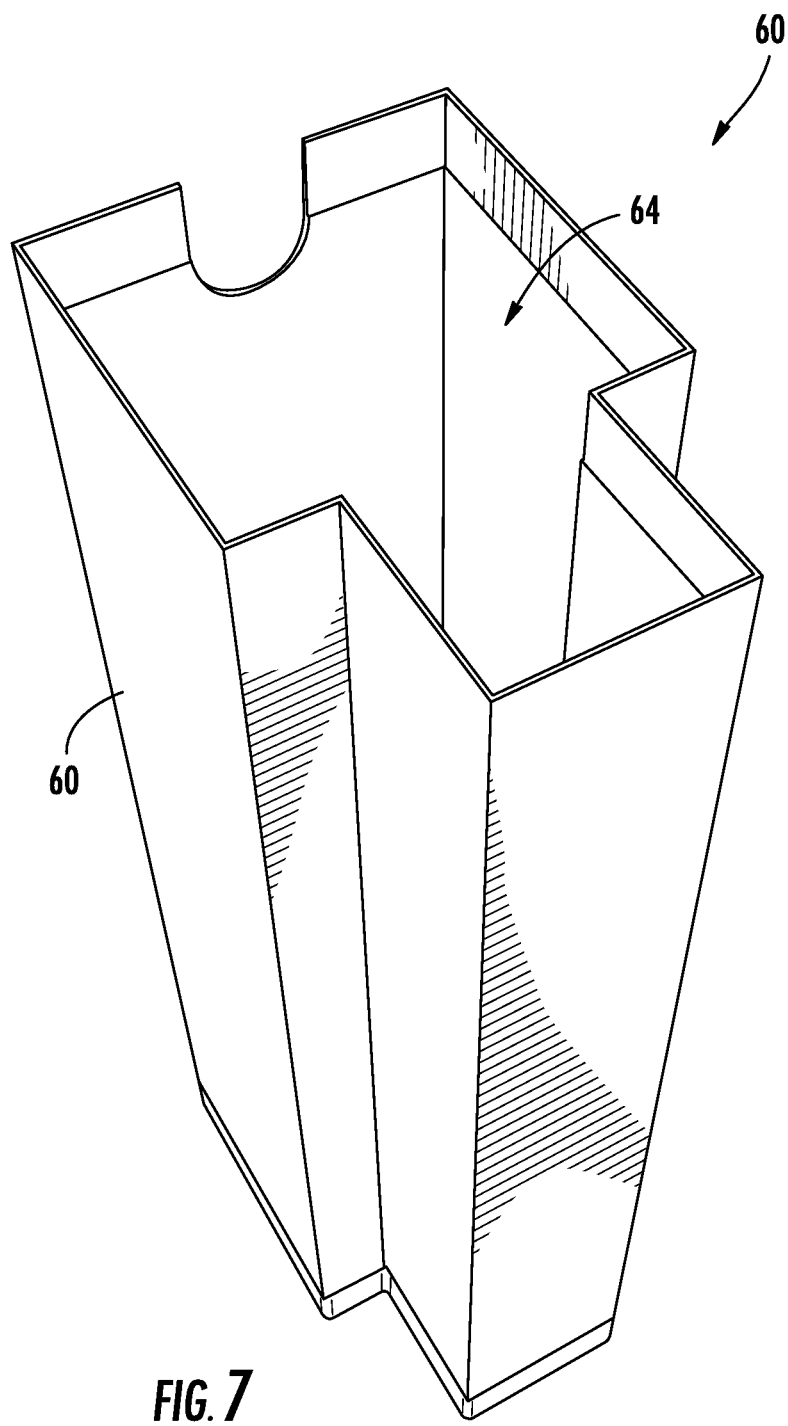
FIG. 7 is a perspective view of a pitcher body 60 forming part of the pitcher assembly 18 of FIG. 6a and FIG. 6b.
Figure 8:
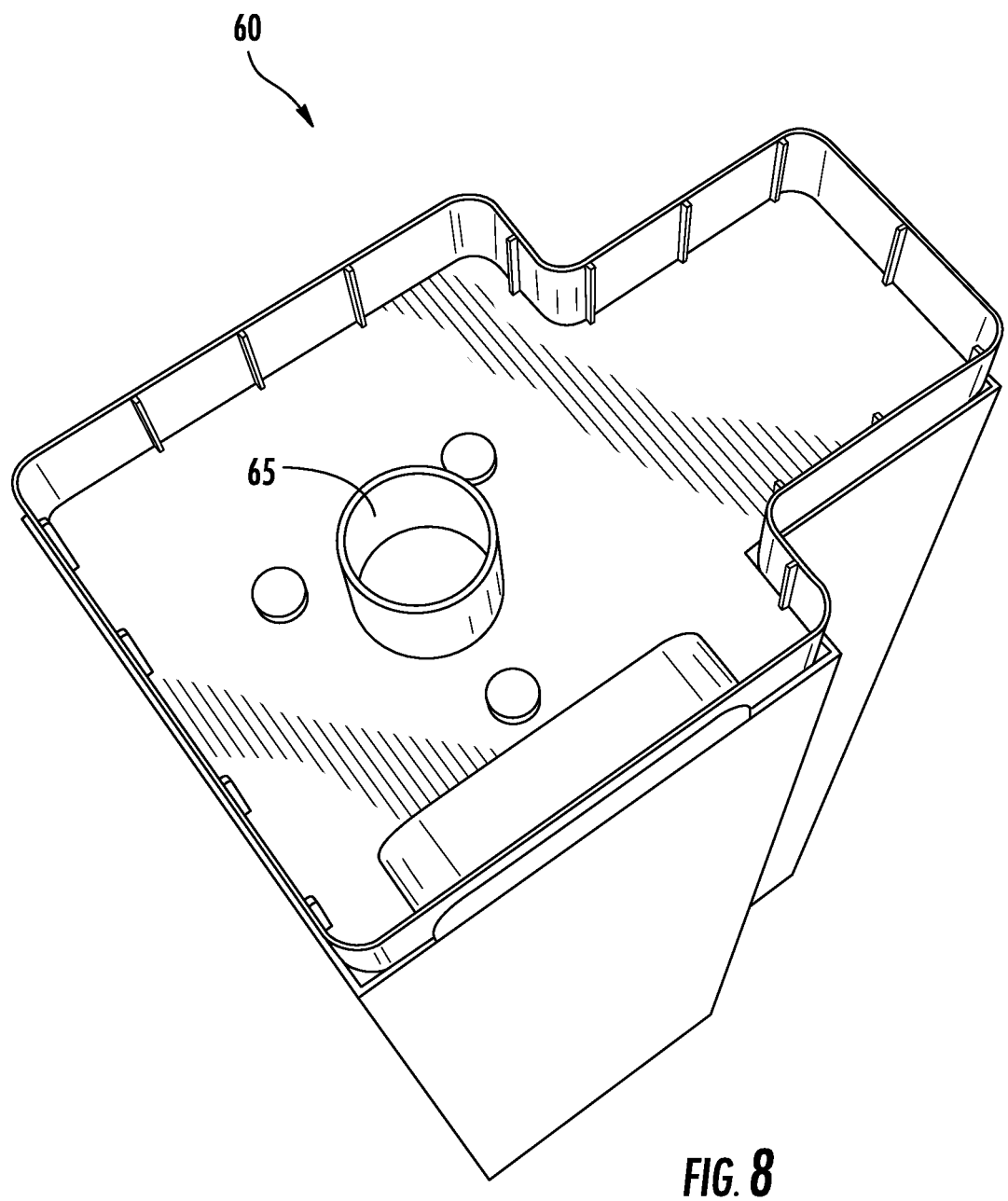
FIG. 8 is a bottom perspective view thereof.
Figure 9A:
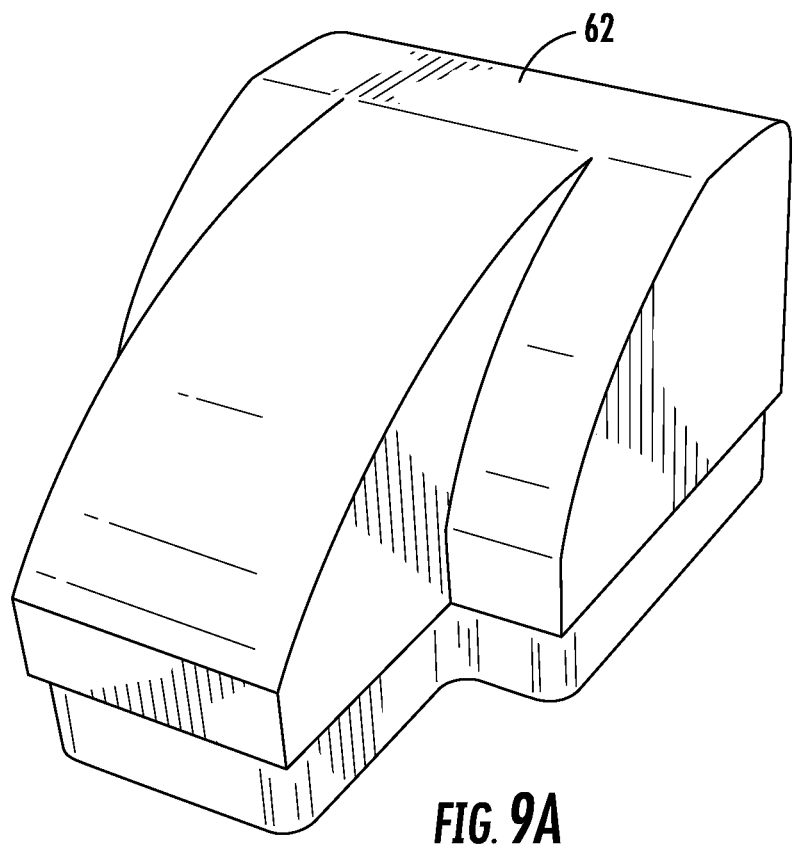
FIGS. 9a and 9b are top a bottom perspective views, respectfully, of the pitcher lid 62 forming part of the pitcher assembly 18 of FIG. 6a and FIG. 6b.
Figure 9B:
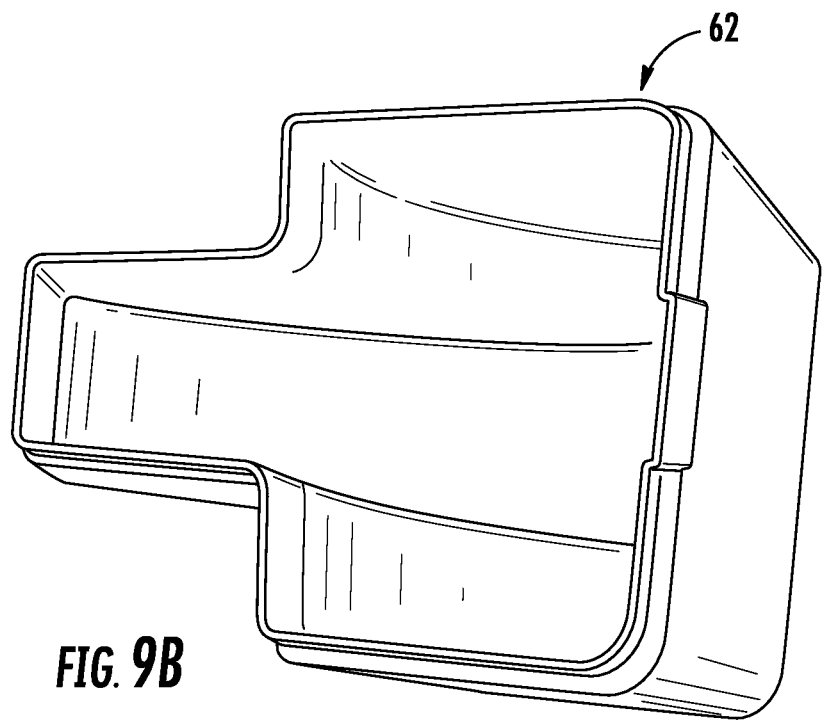
Figure 10A:
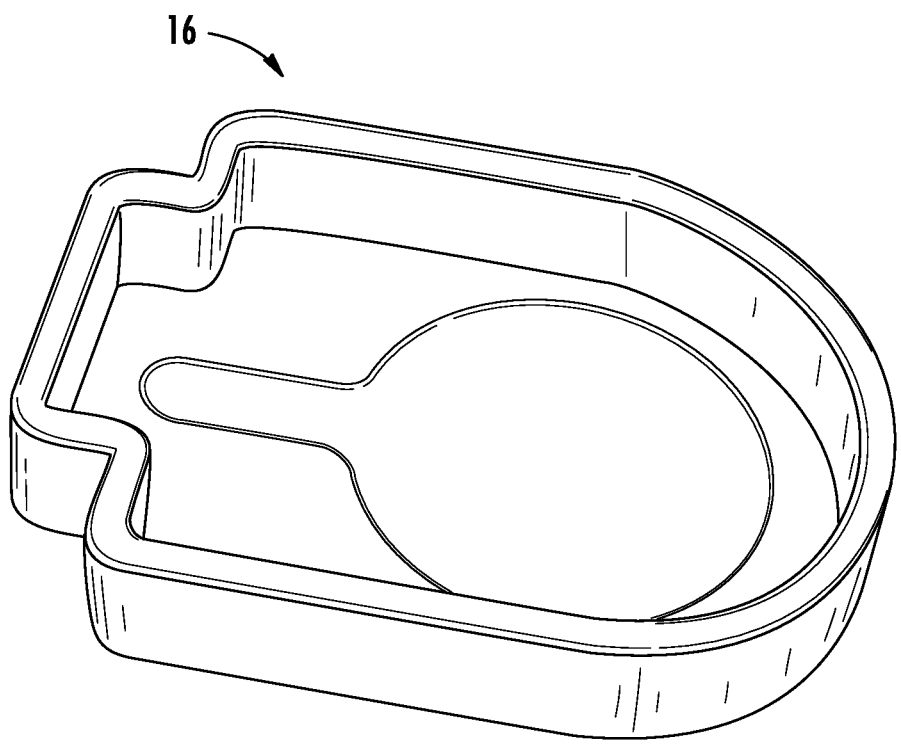
FIG. 10a and FIG. 10b are top a bottom perspective views, respectfully, of the overflow tray 16 for use with the preferred embodiment of the present invention.
Figure 10B:
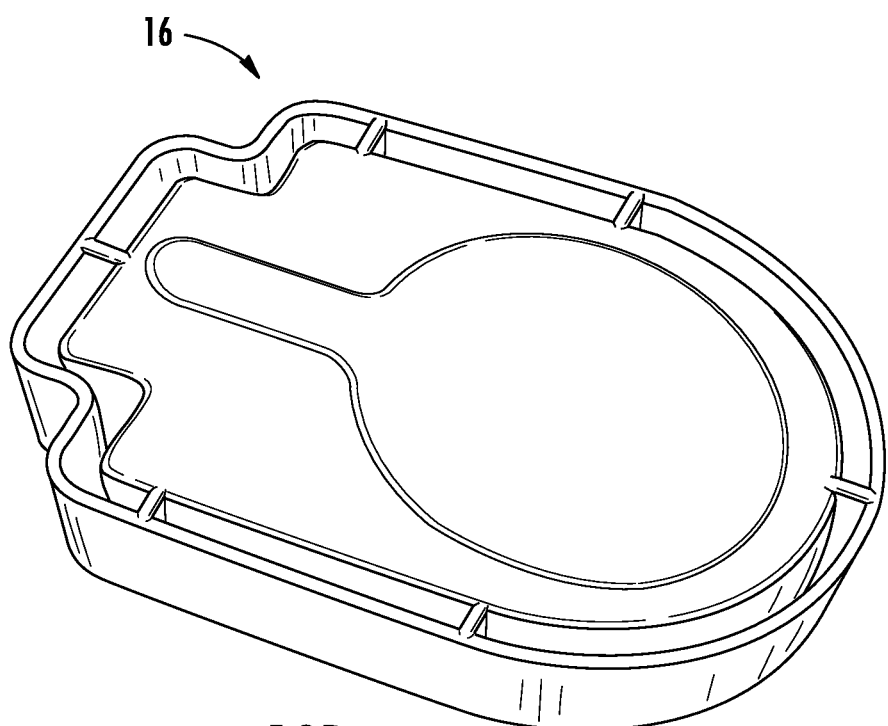

Operation of the present invention is best described in conjunction with FIG. 5 in which an in-situ countertop beverage maker for carbonated and uncarbonated beverages according to the preferred embodiment of the present invention. The level sensor within the fluid reservoir identifies the present of a sufficient amount of liquid from which to form a mixed beverage. If present, upon initiation the pump will operate for a predetermined cycle period for providing the carbonation chamber with sufficient liquid (either 7 ounces or 14 ounces) depending upon the size beverage selected. A thermister measures temperature of the fluid portion and can control the amount of CO2 pressure needed for saturation. Is sufficient CO2 pressure exists in the canister 31 then the pump is powered and the vent valve opened to allow for filling of the canister with fluid. Once full, the carbonation chamber is pressurized by opening the CO2 valve to allow the pressurized canister to pressurize the carbonation chamber up to the appropriate saturation pressure (approximately 125 psi). A pressure transducer in fluid communication with the carbonation chamber through the junction block 100. If the carbonation chamber experiences a pressure above the desired target pressure, a high pressure relieve valve will release gas until the excess pressure is relieved.

In conjunction with the preferred embodiment of the present invention, the beverage maker 10 incorporates the Central Processing Unit for operationally controlling all of the internal controls. When the beverage maker 10 is activated, a user interface displaced on the operational control unit 24 will indicate status, cycle step and operation by use of illuminated LED driven directly from the internal power supply 54.

The present invention provides a novel means to make a customized single-serving of chilled, sparkling beverage at home. A complete line of home, office and commercial appliances will have the basic attributes of a Sparkling Beverage Maker that will:

Give the consumer the ability to make on demand his/her choice of beverage in a single-service glass either a sparkling water with or without flavor, a sparkling fruit juice or an enhance soft drink, low in sugar with vitamins and minerals.

Give the consumer to ability to regulate and control the beverage temperature.

Give the consumer the ability to regulate the level of carbonation from low, medium and high.

Give the consumer the ability to choose and regulate the flavor of sparkling water as the dispensing takes place for a continual and immediate freshness.

Gives the consumer the ability to switch over to making a sparkling fruit juice.

Gives the consumer the ability to switch over to making a healthy soda pop.

Gives the consumer the luxury of benefitting from these single-serving glasses, on-demand, at a push of a button freshness, eliminating waste due to loss of carbonation going flat at a fraction of the cost of store-bought beverages.

The foregoing descriptions of specific embodiments of the present invention have been presented for the purposes of illustration and description. They are neither intended to be exhaustive nor to limit the invention to the precise forms disclosed and, obviously, many modifications and variations are possible in light of the above teaching. The embodiments were chosen and described in order to best explain the principles of the invention and its practical application, to thereby enable others skilled in the art to best utilize the invention and the various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A carbonated beverage maker capable of making customized beverages in a single-serving, said beverage maker comprises:
    a water reservoir configured to provide water;
    a carbon dioxide source configured to provide carbon dioxide;
    a carbonation chamber in fluid communication with the water reservoir and the carbon dioxide source, wherein the carbonation chamber defines a controlled volume for receiving a selected volume of water, wherein the carbonation chamber is configured to receive carbon dioxide in a controlled manner so as to alter and control carbon dioxide absorption of the selected volume therein;
    an individually packed, single use disposable flavor cup containing a flavor and having a sealed cover that covers and seals said flavor cup;
    a water injection nozzle configured to access said flavor cup, wherein the water injection nozzle is in fluid communication with the carbonation chamber and is configured to operatively charge said flavor cup with the selected volume of the carbonation chamber so as to mix the selected volume with the flavor within the flavor cup to form a single-serving, on-demand volume of a flavored beverage; and
    a discharge port for dispensing the flavored beverage from said flavor cup.

2. The beverage maker of claim 1, wherein said flavor cup contains a selected flavored syrup.

3. The beverage maker of claim 2, wherein said syrup is fortified with at least one of vitamins, herbs, or minerals.

4. The beverage maker of claim 1 further comprising operative controls for selectively engaging the carbon dioxide source as desired.

5. The beverage maker of claim 1, wherein said flavor cup functions as a mixing chamber for the selected volume of the carbonation chamber and the flavor.

6. The beverage maker of claim 1, wherein said beverage maker further comprises an overall outer housing for containing the working components having an overall height of less than 15.5 inches, and an overall width of less than 14 inches wide, and an overall depth of 12.75 inches deep.

7. The beverage maker of claim 1, wherein said water reservoir is removable and functions alternately as a beverage pitcher capable of being placed in a refrigerator such as to chill any fluid contents.

8. The beverage maker of claim 1 further comprising a junction block that functions as a manifold for distribution of carbon dioxide, chilled water, and carbonated water throughout the beverage maker.

9. The beverage maker of claim 8, wherein the carbonation chamber is in fluid communication with said junction block, wherein said carbonation chamber defines a 16 oz. canister cylinder configured to receive carbonation from a source having a service pressure of 1800 psi.

10. The beverage maker of claim 1, wherein the carbonation chamber defines a dose carbonator.

11. The beverage maker of claim 1, wherein the carbon dioxide source is configured to pulse carbon dioxide to the carbonation chamber for improved carbonation of the water.

12. The beverage maker of claim 1, wherein the selected volume in the carbonation chamber defines at least one of 7 fluid ounces for the dispensing of 8 ounce flavored beverages or fluid ounces for the dispensing of 16 ounce flavored beverages.

13. The beverage maker of claim 1, wherein the carbonation chamber defines a headspace above the selected volume, wherein the headspace defines a residual pressure such that the selected volume is urged out of the carbonation chamber without the need of an additional pump.

14. The beverage maker of claim 1 further comprising a user interface configured to indicate status of the customized beverage.

15. The beverage maker of claim 5, wherein the flavored beverage is fully mixed within the flavor cup.

16. The beverage maker of claim 1 further comprising a means for altering the temperature of the carbonation chamber.

17. The beverage maker of claim 16, wherein the means for altering the temperature of the carbonation chamber comprises at least one of a refrigerator compressor, a thermoelectric cooler, or a solid state heat pump.

18. The beverage maker of claim 1 further comprising a cooling means for providing cooling to the water reservoir.

19. The beverage maker of claim 1, wherein the carbonation chamber is further configured to alter and control temperature and pressure of the selected volume therein.

20. A method for making customized, single-serving beverages in a beverage maker, the method comprising:
    receiving an individually packed, single use disposable flavor cup containing a flavor, wherein the flavor cup comprises a seal that covers and seals the flavor cup;
    operatively mixing a selected volume of water and carbon dioxide within a carbonation chamber, wherein the carbonation chamber defines a controlled volume for receiving the selected volume of water, and wherein the carbonation chamber is configured to receive carbon dioxide in a controlled manner so as to alter and control carbon dioxide absorption of the selected volume therein;

projecting a water injection nozzle through the seal of the flavor cup;

operatively charging said flavor cup with the selected volume of the carbonation chamber so as to mix the selected volume with the flavor within the flavor cup to form a single-serving, on-demand volume of a flavored beverage; and dispensing flavored beverage from the flavor cup.

\* \* \* \* \*

UNITED STATES PATENT AND TRADEMARK OFFICE
CERTIFICATE OF CORRECTION

| | |
|---|---|
| PATENT NO. | : 8,677,888 B2 |
| APPLICATION NO. | : 12/573507 |
| DATED | : March 25, 2014 |
| INVENTOR(S) | : Santoiemmo |

Page 1 of 1

It is certified that error appears in the above-identified patent and that said Letters Patent is hereby corrected as shown below:

In the claims:

Column 10,
Line 31, "or fluid ounces" should read --or 14 fluid ounces--.

Signed and Sealed this
First Day of July, 2014

Michelle K. Lee
*Deputy Director of the United States Patent and Trademark Office*